US012394552B2

(12) United States Patent
Mogi et al.

(10) Patent No.: US 12,394,552 B2
(45) Date of Patent: Aug. 19, 2025

(54) WOUND CORE

(71) Applicant: NIPPON STEEL CORPORATION, Tokyo (JP)

(72) Inventors: Hisashi Mogi, Tokyo (JP); Takahito Mizumura, Tokyo (JP); Teruyuki Tamaki, Tokyo (JP); Hiroshi Fujimura, Tokyo (JP); Ryu Hirayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 737 days.

(21) Appl. No.: 17/641,103

(22) PCT Filed: Sep. 3, 2020

(86) PCT No.: PCT/JP2020/033490
§ 371 (c)(1),
(2) Date: Mar. 8, 2022

(87) PCT Pub. No.: WO2021/049419
PCT Pub. Date: Mar. 18, 2021

(65) Prior Publication Data

US 2022/0285074 A1 Sep. 8, 2022

(30) Foreign Application Priority Data

Sep. 10, 2019 (JP) ................................ 2019-164446

(51) Int. Cl.
*H01F 27/26* (2006.01)
*H01F 27/38* (2006.01)

(52) U.S. Cl.
CPC ......... *H01F 27/263* (2013.01); *H01F 27/385* (2013.01)

(58) Field of Classification Search
CPC ........ H01F 27/263; H01F 27/385; H01F 3/02; H01F 3/04; H01F 27/2455; H01F 27/25; H01F 27/33; H01F 27/245; H01F 27/26
USPC .................................. 336/83, 212, 233–234
See application file for complete search history.

(56) References Cited

U.S. PATENT DOCUMENTS

| | | | | |
|---|---|---|---|---|
| 3,309,641 | A * | 3/1967 | Burkhardt | H01F 27/2455 336/213 |
| 6,473,961 | B1 * | 11/2002 | Segal | H01F 27/25 29/609 |
| 2011/0156853 | A1 | 6/2011 | Kato et al. | |
| 2013/0147596 | A1 | 6/2013 | Nakanoue | |

(Continued)

FOREIGN PATENT DOCUMENTS

| | | | |
|---|---|---|---|
| CN | 106526335 | A | 3/2017 |
| EP | 4027359 | A1 | 7/2022 |
| JP | S60-83307 | A | 5/1985 |

(Continued)

*Primary Examiner* — Tuyen T Nguyen
(74) *Attorney, Agent, or Firm* — SOLARIS Intellectual Property Group, PLLC

(57) ABSTRACT

A wound core equipped with a laminated body including plural electrical steel sheets stacked in a ring shape in side view. The laminated body includes plural bent portions, and plural block-shaped portions at positions between adjacent bent portions. At least one bent portion among the plural bent portions is a high stacking factor bent portion, wherein a stacking factor of the electrical steel sheets at the high stacking bent portion is higher than an average stacking factor of the steel sheets at the plural block-shaped portions.

12 Claims, 6 Drawing Sheets

(56) References Cited

U.S. PATENT DOCUMENTS

| | | | |
|---|---|---|---|
| 2020/0126709 | A1 | 4/2020 | Mizumura et al. |
| 2020/0195067 | A1 | 6/2020 | Ichikawa et al. |

FOREIGN PATENT DOCUMENTS

| | | | |
|---|---|---|---|
| JP | 2012-028394 | A | 2/2012 |
| JP | 2017-84889 | A | 5/2017 |
| JP | 2017-157789 | A | 9/2017 |
| JP | 2018-032703 | A | 3/2018 |
| JP | 6538591 | B2 | 7/2019 |
| KR | 10-2019-0089982 | A | 7/2019 |
| WO | 2010/021113 | A1 | 2/2010 |
| WO | 2012/073565 | A1 | 6/2012 |
| WO | 2018/163852 | A1 | 9/2018 |

* cited by examiner

WOUND CORE

TECHNICAL FIELD

The present disclosure relates to a wound core.

BACKGROUND ART

A wound core is employed as a magnetic core of a transformer, a reactor, a noise filter, and the like. Hitherto in transformers, the reduction of an iron loss has become an important issue from the perspective of high efficiency, and the reduction of an iron loss is researched from various perspectives.

Moreover, transformers or the like employing wound cores are widely applicable to electrical and electronic devices. However, a wound core generates noise when a magnetic field is applied due to magnetostriction therefore noise reduction is actively being researched by reducing magnetostrtion.

For example, a low noise winding transformer is disclosed in Japanese Patent Application Laid-Open (JP-A) No. 2017-84889. In this low noise winding transformer, an outer periphery of an iron core made from steel sheets in a coil shape, a circumferential direction band is wound in the steel sheet winding direction. A stacking band having a vibration loss coefficient of $\eta>0.01$ is arranged at the surface side of the circumferential band, between the core and a wound coil around the core.

SUMMARY OF INVENTION

Technical Problem

Technology to reduce the iron loss of a wound core is known in which a wound core is made with plural electrical steel sheets. However, noise is liable to be generated due to magnetostriction to use the electrical steel sheets.

Recently there are demands for even greater reductions in noise for wound cores by reduced magnetostriction. There is room for improvement in reducing wound core noise.

An object of the present disclosure is to provide a wound core with reduced iron loss and the noise.

Solution to Problem

The authors of the present disclosure have researched diligent into reducing the wound core noise of, and have focused on gaps between stacked electrical steel sheets. When an alternative magnetic field is applied to a wound transformer core, electrical steel sheets vibrate in the stacking direction due to magnetostriction generated in the electrical steel sheets. An acoustic wave is generated by the vibration from the gaps between the electrical steel sheets. This acoustic wave is perceived as a sound. The authors of the present disclosure have discovered that the bent portions make the gaps larger between the electrical steel sheets in the wound core, and the gaps at these bent portions have a large influence of the transformer noise. They have discovered that the smaller gaps at the bent portions are made, the lower the noise becomes, and as a result of further research have arrived at the present disclosure.

The gist of an aspect of the present disclosure based on the above discoveries is described below.

A wound core of an aspect of the present disclosure is equipped with a laminated body including plural electrical steel sheets stacked in a ring shape in side view. The laminated body includes plural bent portions, and plural edge portions at positions between adjacent bent portions. At least one bent portion among the plural bent portions possesses a high stacking factor, wherein the highest stacking factor of the electrical steel sheets at the bent portion is higher than an average stacking factor of the electrical steel sheets at the plural block-shaped portions.

Advantageous Effects of Invention

The present disclosure enables provision of a wound core with reduced iron loss and the noise.

DESCRIPTION OF EMBODIMENTS

Figure 1:
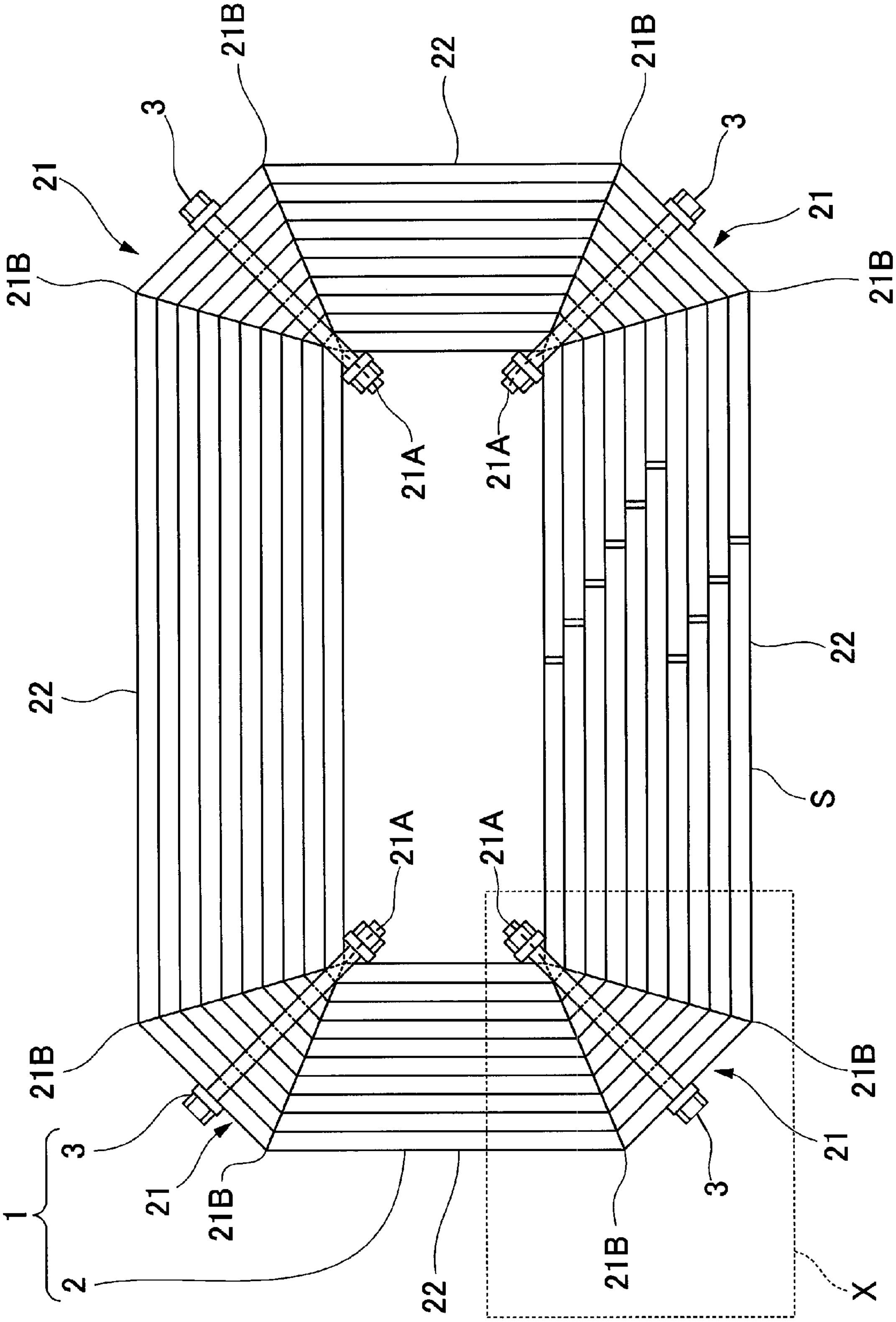
FIG. 1 is a side view illustrating an example of a wound core according to a first exemplary embodiment of the present disclosure.

Detailed description follows regarding exemplary embodiments of the present disclosure, with reference to the appended drawings. Note that configuration elements having essentially the same functional configuration are appended with the same reference numerals in the present specification and drawings, and duplicate explanation thereof will be omitted. Moreover, the proportions and dimensions of each of the configuration elements in the drawings do not represent the actual proportions and dimensions of each of the configuration elements.

First Exemplary Embodiment

Figure 2:
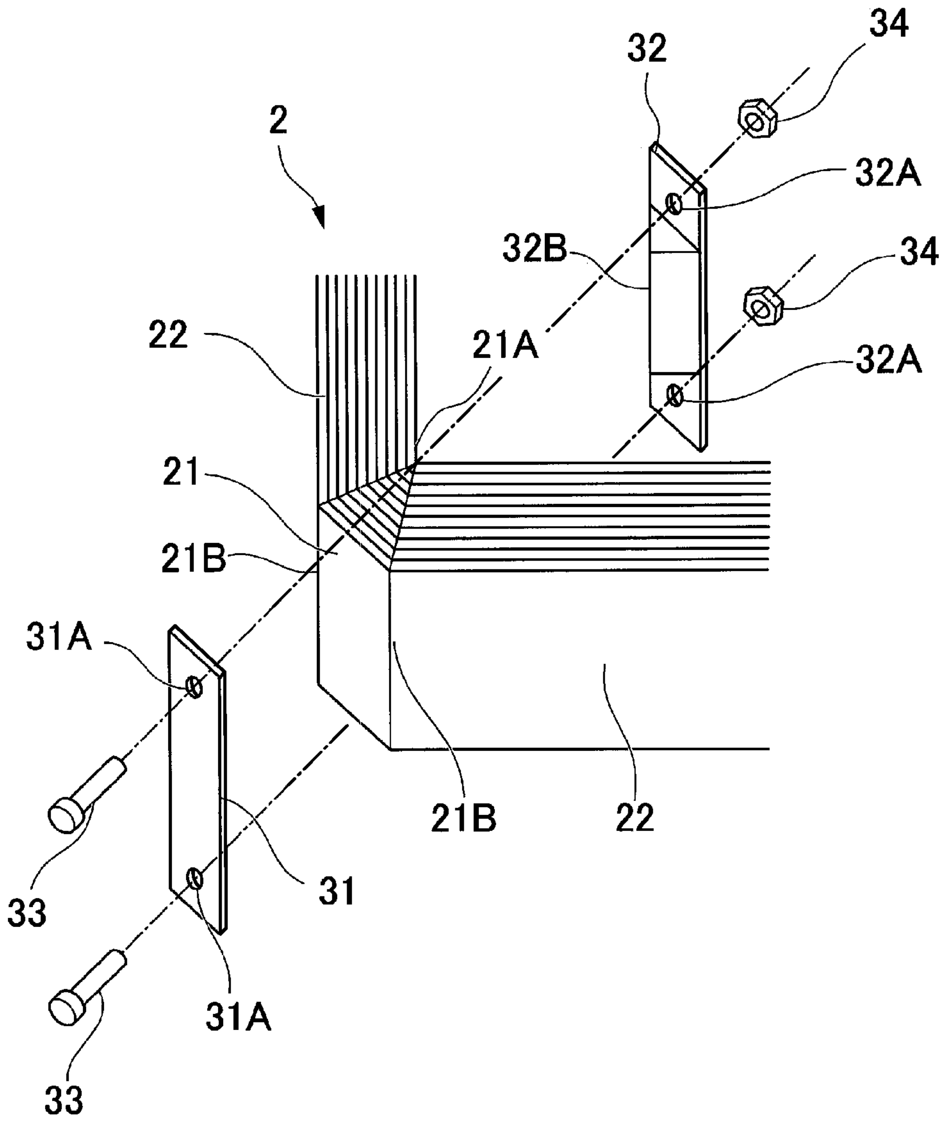
FIG. 2 is an exploded perspective view of a portion X in FIG. 1, and is a diagram illustrating an example of a compression means provided to a wound core according to a first exemplary embodiment.
Figure 3:
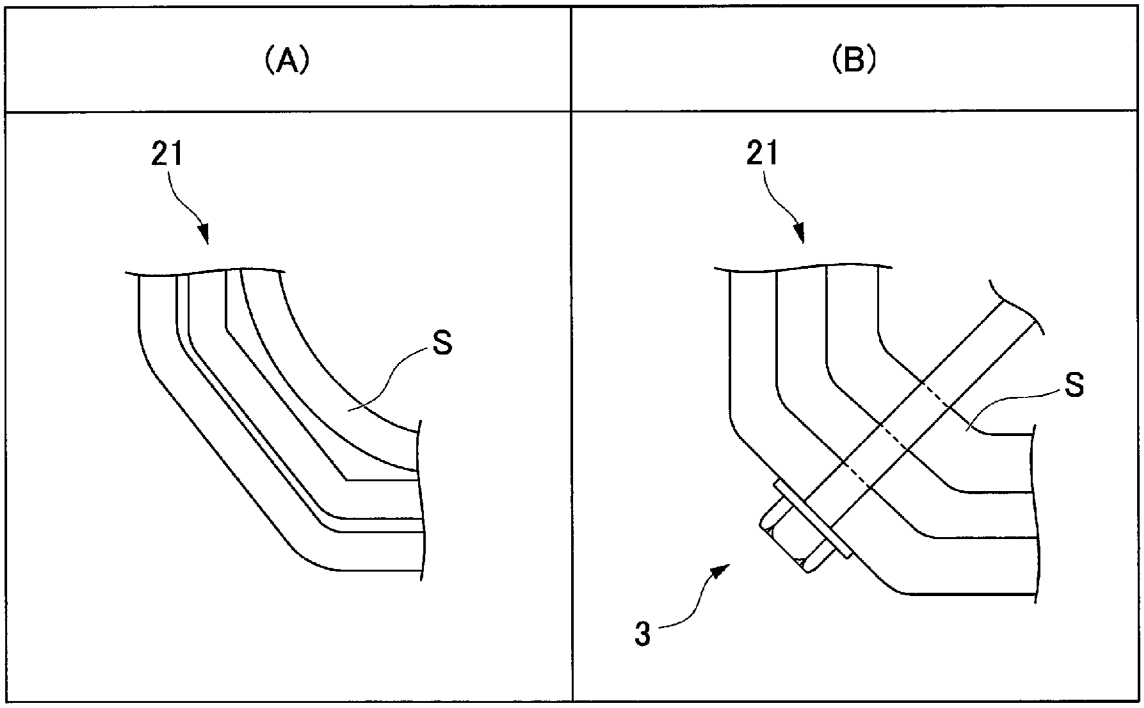
FIG. 3 is a schematic diagram illustrating a bent portion before and after application of a compression means.

First, description follows regarding a wound core according to a first exemplary embodiment, with reference to FIG. 1 to FIG. 3. FIG. 1 is a side view illustrating an example of a wound core according to the present exemplary embodiment. FIG. 2 is an exploded perspective view of a portion X of FIG. 1, and is a diagram illustrating an example of a compression means provided to a wound core. FIG. 3 is a schematic diagram illustrating a bent portion before and after application of a compression means. Note that hereafter a situation in which electrical steel sheets S are viewed from a side face side is referred to as a side view. A direction of stacking of the electrical steel sheets S is referred to as the “stacking direction” where appropriate. Moreover, a sheet width direction of the electrical steel sheets S is referred to as the “sheet width direction” where appropriate. Furthermore, a direction of winding the electrical steel sheets S is referred to as the “winding direction” where appropriate.

A wound core 1 according to the present exemplary embodiment is, as illustrated in FIG. 1, equipped with a laminated body 2 in which plural electrical steel sheets S are stacked in a ring shape in side view (in other words when the wound core 1 is viewed from a side face). Namely, the laminated body 2 is formed by stacking plural electrical steel sheets S respectively formed in ring shapes, by stacking them a plate thickness direction. The laminated body 2 includes plural bent portions 21, and plural block-shaped portions 22 positioned between adjacent bent portions 21. Note that reference to the side face means a face formed by the side faces of the stacked electrical steel sheets S.

As illustrated in FIG. 1, in the laminated body 2 the electrical steel sheets S are stacked and formed into an octagonal shape in side view, and includes the plural bent portions 21 and the plural block-shaped portions 22. Specifically, the laminated body 2 is configured by folding and bending the innermost of the electrical steel sheet S in a rectangular shape so as to form four of the internal corner portions 21A. The electrical steel sheet S positioned at the outer periphery of the innermost electrical steel sheet S is then folded and bent at the internal corner portions 21A of the innermost electrical steel sheet S, with stacking continuing in this manner so as to form two external corner portions 21B. The bent portions 21 of the laminated body 2 are portions where a substantially triangular shaped region is formed by connecting straight lines from a single internal corner portion 21A to the two external corner portions 21B formed by folding and bending the electrical steel sheets S at this internal corner portion 21A. Note that the present disclosure is not limited to such a configuration. For example, for two closely adjacent internal corner portions 21A, a bent portion 21 of the laminated body 2 may be a substantially trapezoidal shaped region formed by connecting straight lines from the two internal corner portions 21A to the two external corner portions 21B. Moreover, the block-shaped portions 22 of the laminated body 2 are substantially straight line shaped portions positioned between adjacent bent portions 21. The laminated body 2 of the present exemplary embodiment accordingly includes four of the bent portions 21 and four of the block-shaped portions 22. When viewed from the side face side of the electrical steel sheet S, the laminated body 2 is configured at the outer periphery with an octagonal shape including eight of the external corner portions 21B. However, the laminated body 2 is configured at the inner periphery with a rectangular shape including four of the internal corner portions 21A.

The stacking factor of the electrical steel sheets S is substantially the same at each of the four bent portions 21 in the laminated body 2. Moreover, the stacking factor of the electrical steel sheets S is substantially the same at each of the four block-shaped portions 22 in the laminated body 2. Note that although in the present exemplary embodiment the stacking factor of the electrical steel sheets S is substantially the same at each of the four bent portions 21 in the laminated body 2, the stacking factor of the electrical steel sheets S may be different at each of the four bent portions 21. In such cases the stacking factor of the electrical steel sheets S at the bent portions 21 may be adjusted using a compression means 3, described later.

Note that the stacking factor of the bent portions 21 and the block-shaped portions 22 of the laminated body 2 may be computed based on JIS C 2550-5:2011. Note that JIS C 2550-5:2011 corresponds to IEC 60404-13:1995 "Magnetic materials—Part 13: Methods of measurement of density, resistivity and stacking factor of electrical steel sheet and strip".

Although, for example, either known directional electrical steel sheets or known non-oriented electrical steel sheets may be employed in the laminated body 2, grain-oriented electrical steel sheets are preferably employed. Employing grain-oriented electrical steel sheets in the laminated body 2 enables the hysteresis loss component of iron loss to be reduced, enabling the iron loss of the wound core 1 to be reduced even further.

The thickness of the electrical steel sheets S is not particularly limited and may, for example, be 0.20 mm or greater, and may be 0.40 mm or less. Using electrical steel sheets S having a small (thin) thickness means that eddy currents are not liable to be generated within a sheet thickness plane of the electrical steel sheets S, enabling the eddy current loss component of iron loss to be reduced further. As a result this enables the iron loss of the wound core 1 to be reduced. The thickness of the electrical steel sheets S is preferably 0.18 mm or greater. Moreover, the thickness of the electrical steel sheets S is preferably 0.35 mm or less, and is more preferably 0.27 mm or less.

The stacked electrical steel sheets S are insulated from each other. Preferably insulation from each other is preferably performed by subjecting surfaces of the electrical steel sheets S to insulation treatment. Insulating between layers of the electrical steel sheets S means that eddy currents are not liable to be generated within the sheet thickness plane of the electrical steel sheets S, enabling the eddy current loss component to be reduced. As a result this enables the iron loss of the wound core 1 to be reduced further. For example, preferably the surfaces of the electrical steel sheets S are subjected to insulation treatment using an insulating coating solvent containing colloidal silica and a phosphate.

Moreover, in the wound core 1 there is a compression mean 3 provided to at least one from out of the plural bent portions 21 for compressing the bent portion 21 in the electrical steel sheet S stacking direction. Specifically, the bent portion 21 is compressed by the compression means 3 from both sides in the electrical steel sheet S stacking direction (in other words, the bent portion 21 is compressed in the electrical steel sheet S stacking direction from both the inner peripheral side and the outer peripheral side of the bent portion 21).

The compression means 3 of the present exemplary embodiment includes an outer sheet 31, an inner sheet 32, bolts 33, and nuts 34.

As illustrated in FIG. 2, the outer sheet 31 and the inner sheet 32 are respectively disposed at the outer peripheral side and the inner peripheral side of the bent portion 21. Moreover, lengths of the outer sheet 31 and the inner sheet 32 along the sheet width direction of the electrical steel sheets S configuring the laminated body 2 are greater than a sheet width of the electrical steel sheets S configuring the laminated body 2, and there are insertion holes 31A, 32A for inserting the bolts 33 through provided in the two length direction end portions of the outer sheet 31 and of the inner sheet 32. Note that reference to the outer peripheral side and the inner peripheral side of the bent portion 21 means the outer peripheral side and the inner peripheral side of the laminated body 2 at the bent portion 21.

The inner sheet 32 includes a projection 32B extending along the length direction of the inner sheet 32 and conforming to the shape of the internal corner portion 21A such that no gap is made between the inner sheet 32 and the laminated body 2. The projection 32B is preferably configured from a soft material capable of absorbing vibrations of the electrical steel sheets S. For example, a resin, a wood, or the like is preferably employed as the material of the projection 32B.

The outer sheet 31 and the inner sheet 32 are arranged such that the insertion holes 31A, 32A provided in the two respective ends thereof stick out from the side faces of the bent portions 21. The bolts 33 are then inserted into the insertion holes 31A of the outer sheet 31, and inserted into the insertion holes 31B of the inner sheet 32 that corresponds to the insertion holes 31A, and the inner sheet 32 and the inner sheet 32 are coupled together by screwing the nuts 34 onto the bolts 33. The nuts 34 are then tightened, compressing each of the bent portions 21 with the outer sheet 31 and the inner sheet 32 along the stacking direction. Note that the outer sheet 31 is an example of a first fixture, the inner sheet 32 is an example of a second fixture, and the bolts 33 and the nuts 34 are examples of coupling parts. Thus the compression means 3 includes the first fixture abutting the bent portion 21 at the outer peripheral side, the second fixture abutting the bent portion at the inner peripheral side, and the coupling part coupling the first fixture and the second fixture together. The first fixture and the second fixture receive constraining force due to the coupling part, and the bent portion 21 is compressed in the electrical steel sheet S stacking direction. In other words, the plural electrical steel sheets S configuring the bent portion 21 are compressed in the stacking direction.

Thus at least one bent portion 21 from out of the plural bent portions 21 is compressed in the electrical steel sheet S stacking direction by the compression means 3 at the bent portion 21. As schematically illustrated at (A) in FIG. 3, a gap is generated between the electrical steel sheets S at the bent portion 21 before the compression means 3 is applied. Generally the stacking factor of the electrical steel sheets S at the bent portion 21 before the compression means 3 is applied is smaller than the stacking factor of the electrical steel sheets S at the block-shaped portions 22. However, as illustrated at (B) in FIG. 3, gaps between the electrical steel sheets S are smaller at the bent portion 21 compressed in the electrical steel sheet S stacking direction by the compression means 3. The compression means 3 thereby enables the stacking factor of the electrical steel sheets S to be increased at the bent portion 21. In the present exemplary embodiment, employing the compression means 3 enables the stacking factor of the electrical steel sheets S at the bent portion 21 to be made higher than the average stacking factor of the electrical steel sheets S at the plural block-shaped portions 22. Noise generated from gaps between the electrical steel sheets S of the bent portion 21 is thereby reduced in cases in which an alternating magnetic field is applied to the wound core 1 with smaller gaps between the electrical steel sheets S at the bent portion 21.

Note that the bent portion 21 having a higher stacking factor of electrical steel sheets S than an average stacking factor of the electrical steel sheets S at the plural block-shaped portions 22 correspond to a high stacking factor bent portion of the present disclosure.

Moreover, the compression of the bent portion 21 by the compression means 3 is preferably compression so as to achieve a stacking factor of the compressed bent portion 21 that is 93% or greater, and is more preferably compression to achieve 96% or greater. In cases in which the stacking factor of the compressed bent portion 21 is 93% or greater, gaps between the electrical steel sheets S are made even smaller, enabling a further reduction in noise from the wound core 1 when an alternating magnetic field is applied thereto. An even greater reduction of noise from the wound core 1 is achievable in cases in which the stacking factor of the compressed bent portion 21 is 96% or greater. Note that the upper limit to the stacking factor of the compressed bent portion 21 is 100%.

Note that although the compression means 3 may be provided to at least one bent portions 21, the compression means 3 is preferably provided to more of the bent portions 21. Providing the compression means 3 to more of the bent portions 21 reduces overall gaps at the bent portions 21 of the laminated body 2, enabling a reduction in noise to be achieved. Moreover, the compression means 3 is preferably provided to all of the bent portions 21. Providing the compression means 3 to all of the bent portions 21 reduces gaps between the electrical steel sheets S for the entire laminated body 2, enabling an even greater reduction to be achieved in the noise of the wound core 1 when applied with an alternating magnetic field.

Moreover, the outer sheet 31, the inner sheet 32, the bolts 33 and the nuts 34 are formed from non-magnetic material. For example, a wood, a resin, copper, brass, or the like is preferably employed as the non-magnetic material. Eddy currents can be prevented from being generated in the compression means 3 as long as the outer sheet 31, the inner sheet 32, the bolts 33, or nuts 34 are non-magnetic material, and as a result this enables an increase in the iron loss to be prevented from occurring.

Moreover, the compression means 3 preferably includes non-illustrated insulating washers. Including insulating washers in the compression means 3 prevents current from flowing as a circuit through the outer sheet 31, the inner sheet 32, the bolts 33, and the nuts 34. A stable magnetic field is able to be formed by preventing the generation of a magnetic field by such current. As a result an increase in iron loss is prevented from occurring. Preferably at least one out of the outer sheet 31, the inner sheet 32, the bolts 33, or the nuts 34 is an insulator in cases in which there are no insulating washers provided in the compression means 3. Employing an insulator for at least one out of the outer sheet 31, the inner sheet 32, the bolts 33, or the nuts 34 means that current does not flow in the compression means 3, enabling a stable magnetic field to be achieved, and enabling an increase in iron loss to be prevented from occurring. As an insulating material, various known insulators may be employed such as, for example, a natural rubber, epoxy resin, polyvinyl chloride, or polyurethane insulating material.

Thus in the present exemplary embodiment described above, due to at least one bent portions 21, from out of the plural bent portions 21, being compressed by the compression means 3 in the electrical steel sheet S stacking direction at the bent portion 21, gaps between the electrical steel sheets S are made smaller at the compressed bent portion 21. As a result noise generated from such gaps when an alternating magnetic field is applied to the wound core 1 can be reduced.

The wound core 1 according to the present exemplary embodiment is, for example, applicable to a transformer. A transformer according to the present exemplary embodiment is equipped with the wound core 1 according to the present exemplary embodiment, a primary winding, and a secondary winding. A magnetic field is generated in the wound core 1 by an alternating current voltage being applied to the primary winding, and a voltage is induced in the secondary winding by changes in the generated magnetic field. The laminated body 2 including the wound core has at least one out of the bent portions 21 that is compressed in the electrical steel sheet S stacking direction by the compression means 3 at the bent portion 21. Gaps between the electrical steel sheets S are therefore smaller at the compressed bent portion 21. As a result noise from the transformer can be suppressed.

Second Exemplary Embodiment

Figure 4:
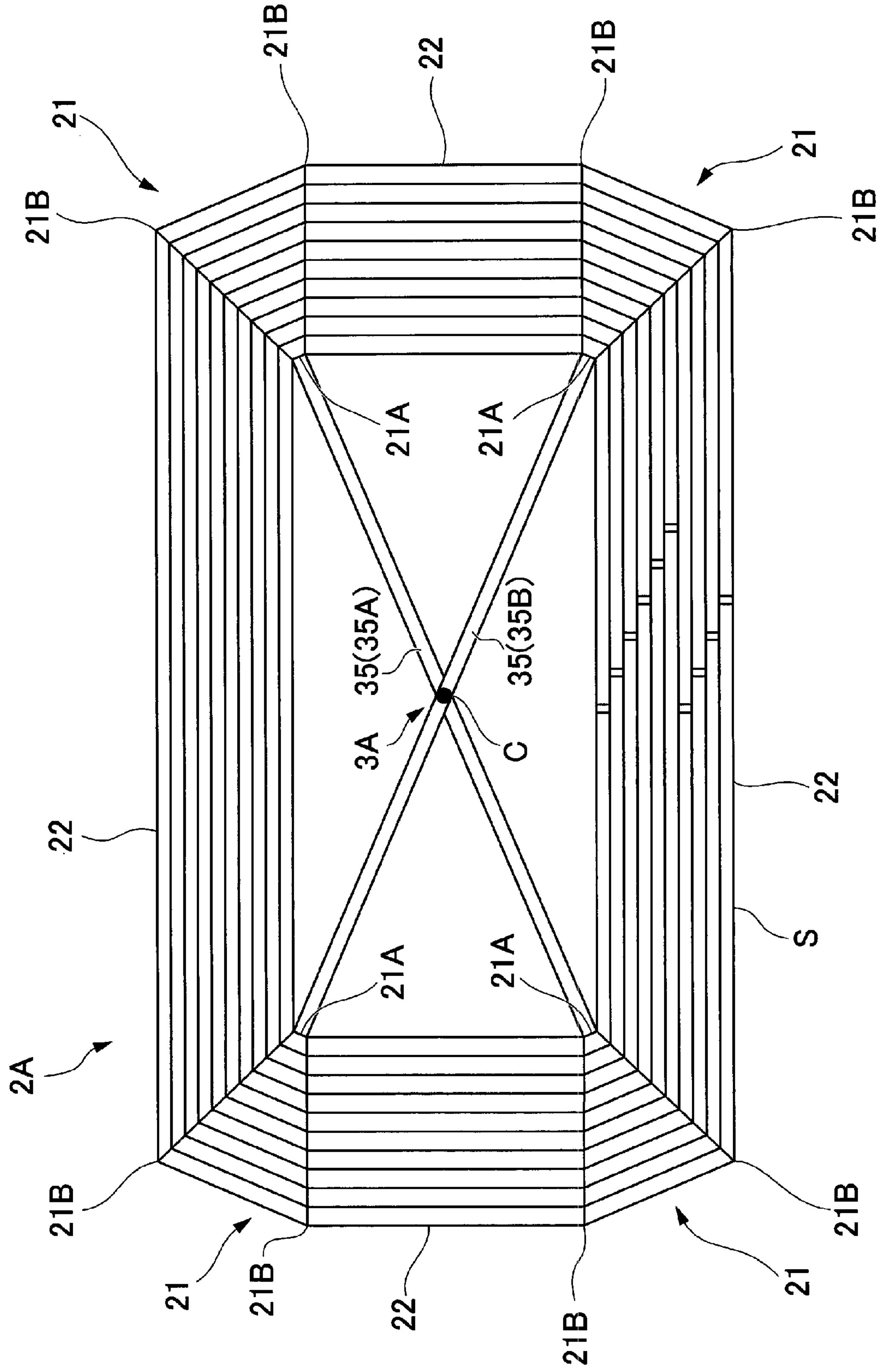
FIG. 4 is a side view illustrating an example of a wound core according to a second exemplary embodiment of the present disclosure.

Next, description follows regarding a wound core 1A according to a second exemplary embodiment, with reference to FIG. 4. FIG. 4 is a side view illustrating an example of a wound core according to the present exemplary embodiment. As illustrated in FIG. 4, the wound core 1A is equipped with a laminated body 2A and a compression means 3A. Although the laminated body 2A differs from the laminated body 2 according to the first exemplary embodiment in that the laminated body 2A includes four straight line shaped internal corner portions 21A, the basic configuration is the same as that of the laminated body 2 described in the first exemplary embodiment, and so detailed explanation thereof will be omitted. Note that configuration the same as that of the first exemplary embodiment is appended with the same reference numerals and explanation thereof will be omitted.

In the first exemplary embodiment a description has been given of the compression means 3 receiving a constraining force from the coupling parts coupling the first fixture and the second fixture, and the bent portions 21 being compressed in the electrical steel sheet S stacking direction thereby, however the compression means is not limited to the configuration described above. For example, the compression means may adopt a mode as illustrated in FIG. 4. As illustrated in FIG. 4, the laminated body 2A of the wound core 1A includes respective bent portions 21 at positions facing each other across a center axis C of the laminated body 2A in side view. The compression means 3A applies force to the bent portions 21 through the internal corner portions 21A, and compresses the bent portions 21. Specifically, the compression means 3A includes plural compression members 35 that, through the internal corner portions 21A, compress two of the bent portions 21 facing each other across the center axis C of the laminated body 2A in side view. The compression members 35 are, for example, rod-shaped beams capable of extension-contraction adjustment, and each are a member configured either by a member capable of being adjusted to a given length or by a resilient body. The compression members 35 are, for example, members including a turnbuckle. The compression members 35 are disposed inside the laminated body 2A and on straight lines connecting the two internal corner portions 21A facing each other across the center axis C in side view. The respective pairs of bent portions 21 facing each other across the center axis C are then compressed by extending the compression members 35. Specifically, the compression members 35 press the respective pairs of facing bent portions 21, through the respective pairs of internal corner portions 21A facing each other across the center axis C in side view, by pressing the bent portions 21 from the inner peripheral side toward the outer peripheral side. The pairs of facing bent portions 21 are thereby respectively compressed in the electrical steel sheet S stacking direction. This enables the noise of a wound core applied with an alternating magnetic field to be reduced due to making the gaps between the electrical steel sheets S smaller at the pairs of compressed bent portions 21.

There are preferably plural of the compression members 35 provided in the sheet width direction of the electrical steel sheets S configuring the laminated body 2A. Namely, the compression members 35 are disposed on the straight lines connecting the pairs of internal corner portions 21A facing each other across the center axis C in side view, and there are plural of the compression members 35 disposed in the sheet width direction of the electrical steel sheets S configuring the laminated body 2A. The pairs of bent portions 21 facing each other across the center axis C are thereby uniformly compressed in the sheet width direction of the electrical steel sheets S configuring the laminated body 2A. This enables an even greater reduction to be achieved in the noise of the wound core applied with an alternating magnetic field.

The compression means 3A preferably includes plural compression members 35A, 35B to compress the two pairs of bent portions 21 facing each other across the center axis C in side view. This enables gaps between the electrical steel sheets S to be made smaller for the entire wound core, and as a result enables an even greater reduction to be achieved in the noise of the wound core 1A when applied with an alternating magnetic field. Furthermore, preferably a configuration is adopted in which the compression means 3A includes plural of the compression members 35A disposed on straight lines connecting one pair of the internal corner portions 21A facing each other across the center axis C in side view and includes plural of the compression members 35B disposed on straight lines connecting the other pair of the internal corner portion 21A, with the plural compression members 35A and the plural compression members 35B alternately disposed in the sheet width direction of the electrical steel sheets S. The bent portions 21 are thereby compressed uniformly in a height direction, enabling the stacking factor to be raised.

Note that the compression means 3A is preferably either a non-magnetic material or an insulator. When the compression means 3A is a non-magnetic material then the generation of eddy currents can be prevented in the compression means 3, and as a result this enables an increase in iron loss to be prevented. Moreover, current does not flow in the compression means 3A when the compression means 3A is an insulator, and this enables a stable magnetic field to be formed. As a result an increase in iron loss is prevented.

Modified Examples

Explanation follows regarding a number of modified examples of the exemplary embodiments of the present disclosure described above. Note that each of the modified examples described below may be applied individually to the exemplary embodiments of the present disclosure described above, or the modified examples described below may be combined and applied to the exemplary embodiments of the present disclosure described above. Moreover, each of the modified examples may be applied instead of configuration in the exemplary embodiments of the present disclosure described above, or may be applied in addition to the configuration of the exemplary embodiments of the present disclosure described above.

In the laminated body 2, 2A, preferably an average stacking factor A of the electrical steel sheets S at the plural bent portions 21 is (B−4.0)% or greater, wherein B is the average stacking factor (%) of the electrical steel sheets S at the four block-shaped portions 22. The average stacking factor A of (B−4.0)% or greater enables a reduction in noise of the wound core to be achieved.

Irrespective of the mode of the compression means, the pressure applied to the bent portions 21 is preferably in a range of from 0.2 MPa to 4.0 MPa. The pressure in this range applied to the bent portions 21 leads to a state in which noise is reduced and the iron loss does not deteriorate. Note that, for example, with the wound core 1 according to the first exemplary embodiment the pressure applied to the bent portions 21 can be controlled by tightening torque of the bolts 33 and nuts 34.

In the laminated body 2, 2A, irrespective of the mode of the compression means, a stacking factor C of the electrical steel sheets S at least at one of the bent portions 21 from out of plural bent portions 21 is preferably set to from B % to (B+1)%, wherein B is the average stacking factor (%) of the electrical steel sheets S at the four block-shaped portions 22. Setting the stacking factor C to from B % to (B+1)% enables the stacking factor to be raised at the bent portions 21 without the electrical steel sheets S undergoing plastic deformation. Due to the electrical steel sheets S not undergoing plastic deformation, an undistorted magnetic field is generated, enabling an increase in leaking magnetic flux to be suppressed from occurring. As a result this enables an increase in iron loss to be suppressed. Moreover, due to vibration between the layers of the electrical steel sheets S being suppressed at the bent portions 21, noise can also be suppressed.

Moreover, although in the exemplary embodiments described above cases have been described in which the outer periphery of the laminated body has an octagonal shape, the present disclosure is not limited thereto. The outer periphery of the laminated body may be a polygonal shape, a square shape with rounded corners, an oval shape, an elliptical shape, or the like. For example, an oval shaped laminated body may be manufactured by winding an electrical steel strip. On the other hand, an octagonal shaped laminated body may be manufactured with plural electrical steel sheets folded and bent into a ring shape and stacked in the sheet thickness direction. A laminated body manufactured by stacking plural electrical steel sheets folded and bent into a ring shape by stacking in the sheet thickness direction makes a stacking factor at the bent portions liable to be smaller than in a laminated body manufactured by winding an electrical steel strip. Thus in cases in which a compression means is applied to a laminated body, applying the compression means to a laminated body manufactured by stacking plural electrical steel sheets that have been folded and bent into a ring shape by stacking in the sheet thickness direction facilitates a high noise reduction effect, compared to application of a compression means to a laminated body manufactured by winding an electrical steel strip, making it easier to achieve a high noise reduction effect. Moreover, the greater the number of folds and bends in the electrical steel sheets, the smaller the stacking factor at the bent portions. Therefore in order to increase the stacking factor raising effect by the compression means at the bent portions, the compression means is preferably applied to an octagonal shaped laminated body.

In the exemplary embodiments described above, cases have been described in which the inner periphery of the laminated body 2, 2A is a quadrangular shape or an octagonal shape, however the present disclosure is not limited thereto. The inner periphery of the laminated body 2, 2A may be another polygonal shape, a square shape with rounded corners, an oval shape, an elliptical shape or the like. For example, in cases in which the inner periphery of the laminated body 2, 2A is an octagonal shape, a portion connecting two adjacent apexes of the octagonal shape is an internal corner portion, and in cases in which the inner periphery of the laminated body 2, 2A is an oval shape, arc shaped potions are internal corner portions. In cases in which the inner periphery of the laminated body 2, 2A is a polygonal shape, a square shape with rounded corners, an oval shape, an elliptical shape or the like, the bent portions 21 are portions at positions between one adjacent block-shaped portion and another adjacent block-shaped portion where the electrical steel sheets S are bent with respect to the extension directions of the electrical steel sheet S at the one block-shaped portion and the electrical steel sheets S at the other block-shaped portions, and stacked. Note that a shape of end portions of the compression means 3A described in the second exemplary embodiment may be a shape conforming to the shape of the internal corner portions 21A. This enables the bent portions to be compressed uniformly.

Moreover, the inner periphery of the laminated body 2, 2A may be shaped according to the outer periphery shape thereof. For example, in cases in which the outer periphery of the laminated body 2, 2A is an octagonal shape, the inner periphery may also be an octagonal shape, and in cases in which the outer periphery of the laminated body 2, 2A is a square shape with rounded corners, the inner periphery may also be a square shape with rounded corners.

The compression means 3 illustrated in FIG. 1 and the compression means 3A illustrated in FIG. 4 are merely examples thereof, and there is not limitation to the modes described above as long as the compression means is able to compress the bent portions 21.

Moreover, the stacking factor may be lower at least at one of the block-shaped portions 22 from out of the plural block-shaped portions 22 of the laminated body 2, 2A. Specifically, disposing spacers or the like between the electrical steel sheets S at one of the block-shaped portions 22 enables gaps between the electrical steel sheet S to be made larger at this block-shaped portion 22. This enable the heat dissipation surface area of the laminated body 2, 2A to be made larger.

Note that the wound cores described in the modified examples may also be applied to a transformer, similarly to the wound core 1 of the first exemplary embodiment. A transformer applied with a wound core described in the present modified example makes gaps between the electrical steel sheets smaller at the bent portions and so suppresses noise of the transformer, similarly to the transformer applied with the wound core 1.

Description follows regarding Test Examples of the present disclosure. The condition example of the present Test Example is an example of conditions adopted to confirm the implementability and advantageous effects of the present disclosure, and the present disclosure is not limited by this condition example. The present disclosure may adopt various conditions to achieve the object of the present disclosure without departing from the spirit of the present disclosure.

Test Example 1

A laminated body including four bent portions was manufactured by stacking grain-oriented electrical steel sheets having a thickness of 0.20 mm. A wooden compression means was employed at one bent portion from out of the four bent portions, and wound cores that had been compressed by the pressures illustrated in Table 1 were manufactured. The manufactured wound cores have the same configuration as the wound core example illustrated in FIG. 1. Transformers with a capacity of 20 kVA were manufactured using the manufactured wound cores. The stacking factor was computed for the wound cores employed in the manufactured transformer based on JIS C 2550-5:2011. Moreover, the iron loss (no-load loss) and sound pressure were measured for the manufactured transformer based on JEC-2200. Table 1 illustrates values of compression force, stacking factor, sound pressure, and iron loss. Note that a stacking factor C in Table 1 is the stacking factor of the electrical steel sheets at the bent portion when compressed by the compression means, the stacking factor A is the average stacking factor of the electrical steel sheets at the four bent portions, the stacking factor B is an average stacking factor of the electrical steel sheets at the four block-shaped portions. Note that Examples in Table 1 indicate examples of implementations applying the present disclosure, and Comparative Examples indicate examples of implementations not applying the present disclosure.

TABLE 1

| Trans-former | Compres-sion Force (MPa) | Stacking Factor (%) C | A | B | Sound Pressure (dB) | Iron Loss (W) | Example/Comparative Example |
|---|---|---|---|---|---|---|---|
| No. 1 | 0.0 | 86.0 | 86.0 | 96.7 | 63 | 64.47 | Comparative Example |
| No. 2 | 0.1 | 87.4 | 86.4 | 96.7 | 63 | 64.39 | Comparative Example |
| No. 3 | 0.2 | 93.8 | 88.0 | 96.7 | 63 | 64.33 | Comparative Example |
| No. 4 | 0.3 | 95.8 | 88.5 | 96.7 | 63 | 64.26 | Comparative Example |
| No. 5 | 0.4 | 96.8 | 88.7 | 96.7 | 62 | 64.20 | Example |
| No. 6 | 0.5 | 96.8 | 88.7 | 96.7 | 60 | 64.13 | Example |
| No. 7 | 0.6 | 96.9 | 88.7 | 96.7 | 58 | 64.01 | Example |
| No. 8 | 1.0 | 97.0 | 88.8 | 96.7 | 58 | 64.00 | Example |
| No. 9 | 2.0 | 97.3 | 88.8 | 96.7 | 56 | 64.96 | Example |
| No. 10 | 4.0 | 97.5 | 88.9 | 96.7 | 56 | 64.94 | Example |

Making the stacking factor of one bent portion from out of the plural bent portions higher than the average stacking factor of the electrical steel sheets at the four block-shaped portions resulted in a smaller sound pressure and reduced iron loss.

Test Example 2

Figure 5:
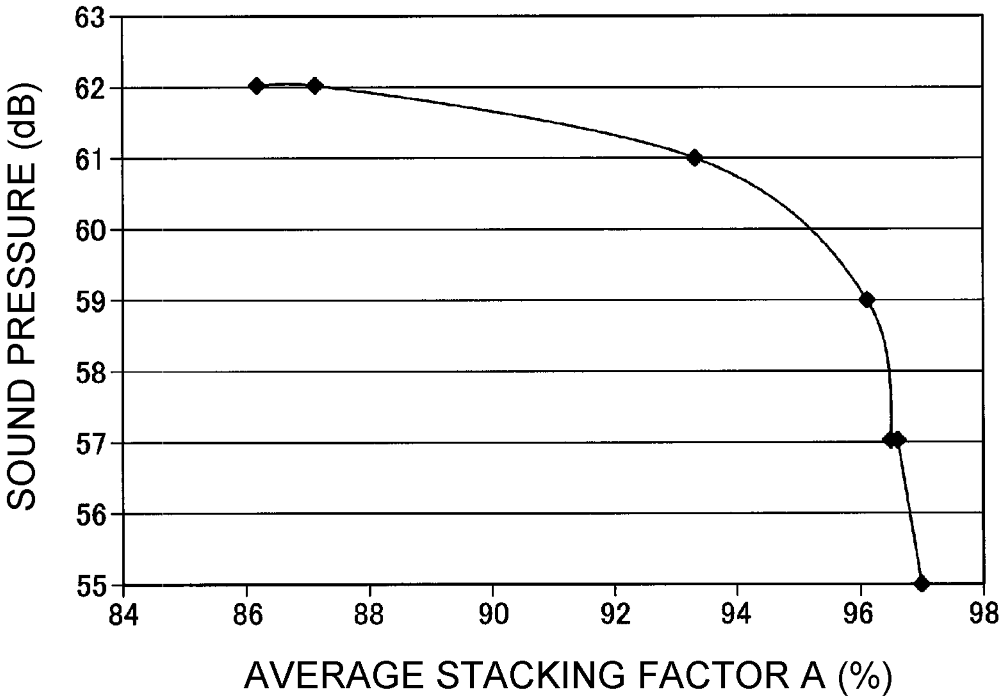
FIG. 5 is a graph illustrating a relationship between sound pressure and an average stacking factor of the electrical steel sheets at four bent portions of a Test Example.

A laminated body including four bent portions was manufactured by stacking grain-oriented electrical steel sheets having a thickness of 0.23 mm. A wooden compression means was employed at each of the four bent portions of the laminated body and wound cores manufactured that had been compressed by the pressures illustrated in Table 2. The manufactured wound cores have the same configuration as the wound core example illustrated in FIG. 1. Transformers with a capacity of 20 kVA were manufactured using the manufactured wound cores. The stacking factor was computed for the wound cores employed in the manufactured transformers based on JIS C 2550-5:2011. Moreover, the iron loss (no-load loss) and sound pressure were measured for the wound cores employed in the manufactured transformers, similarly to in Test Example 1. Table 2 illustrates values of compression force, stacking factor, sound pressure, and iron loss. Note that the average stacking factor A in Table 2 is the average stacking factor of the electrical steel sheets at the four bent portions, and the average stacking factor B is the average stacking factor of the electrical steel sheets at the four block-shaped portions. FIG. 5 illustrates the relationships between the average stacking factor A and sound pressure. Note that Examples in Table 2 indicate examples of implementations applying the present disclosure, and Comparative Examples indicate examples of implementations not applying the present disclosure.

TABLE 2

| Trans-former | Compres-sion Force (MPa) | Average Stacking factor (%) A | B | Sound Pressure (dB) | Iron Loss (W) | Example/Comparative Example |
|---|---|---|---|---|---|---|
| No. 1 | 0.0 | 86.2 | 96.7 | 62 | 69.08 | Comparative Example |
| No. 2 | 0.1 | 87.1 | 96.7 | 62 | 68.99 | Comparative Example |
| No. 3 | 0.2 | 93.3 | 96.7 | 61 | 68.93 | Example |
| No. 4 | 0.3 | 96.1 | 96.7 | 59 | 68.85 | Example |
| No. 5 | 0.4 | 96.5 | 96.7 | 57 | 68.79 | Example |
| No. 6 | 0.5 | 96.6 | 96.7 | 57 | 68.71 | Example |
| No. 7 | 0.6 | 96.8 | 96.7 | 56 | 68.58 | Example |
| No. 8 | 1.0 | 96.8 | 96.7 | 56 | 68.57 | Example |
| No. 9 | 2.0 | 96.9 | 96.7 | 55 | 68.53 | Example |
| No. 10 | 4.0 | 96.9 | 96.7 | 55 | 68.51 | Example |

As illustrated in Table 2, making the average stacking factor of the electrical steel sheets at the four bent portions, i.e. the average stacking factor A, so as to be (B−4.0)% or greater results in a smaller sound pressure and reduced iron loss. Moreover, as illustrated in FIG. 5, the sound pressure was made even smaller in cases in which the average stacking factor A was 96.0% or greater.

Test Example 3

Figure 6:
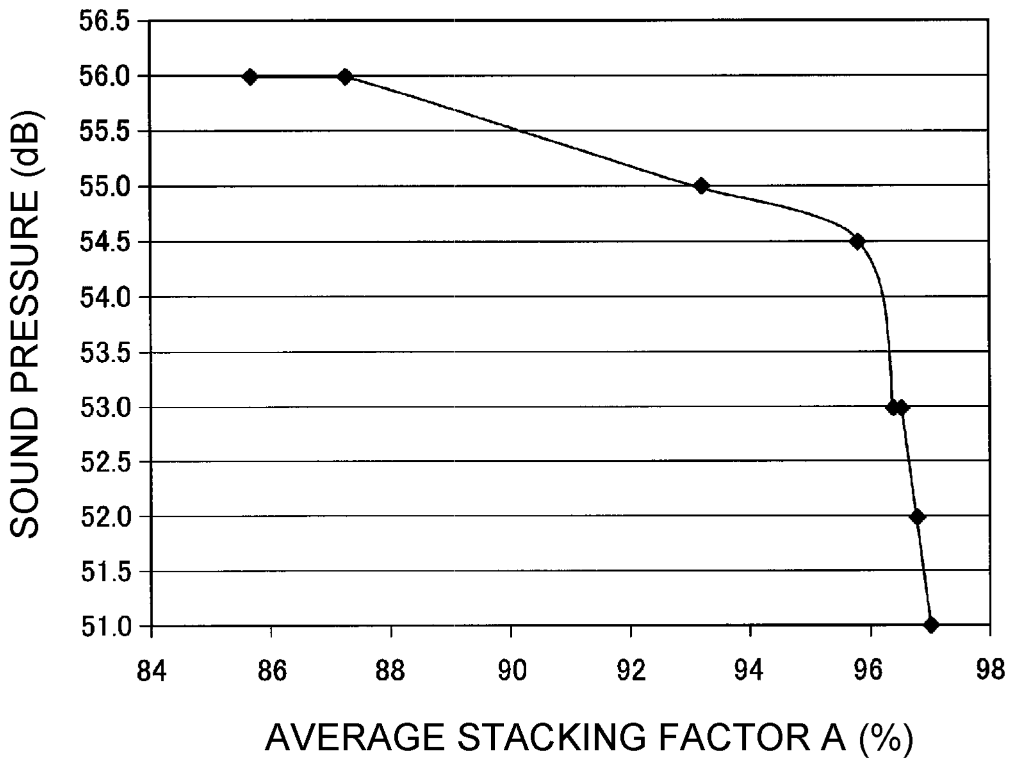
FIG. 6 is a graph illustrating a relationship between sound pressure and an average stacking factor of the electrical steel sheets at four bent portions in a Test Example.

Wound cores were manufactured by a method similar to that of Test Example 1 by employing grain-oriented electrical steel sheets having a thickness of 0.20 mm, and transformers with a capacity of 1 kVA were manufactured using the manufactured wound cores. The manufactured wound cores had the same configuration to that illustrated in FIG. 1. A wooden compression means was employed at each of the four bent portions of the wound cores and the wound cores were compressed by the pressures illustrated in Table 3. The stacking factor was computed for the wound cores employed in the manufactured transformers based on JIS C 2550-5:2011. Moreover, the iron loss (no-load loss) and sound pressure were measured for the wound cores employed in the manufactured transformers similarly to in Test Example 1. Table 3 illustrates values of compression force, stacking factor, sound pressure, and iron loss. Note that the average stacking factor A in Table 3 is the average stacking factor of the electrical steel sheets at the four bent portions, and the average stacking factor B is an average stacking factor of the electrical steel sheets at the four block-shaped portions. Moreover, FIG. 6 illustrates relationships between the average stacking factor A and sound pressure. Note that Examples in Table 3 indicate examples of implementations applying the present disclosure, and Comparative Examples indicate examples of implementations not applying the present disclosure.

TABLE 3

| Trans-former | Compres-sion Force (MPa) | Average Stacking factor (%) A | B | Sound Pressure (dB) | Iron Loss (W) | Example/Comparative Example |
|---|---|---|---|---|---|---|
| No. 1 | 0.0 | 85.7 | 96.5 | 56.0 | 2.05 | Comparative Example |
| No. 2 | 0.1 | 87.3 | 96.5 | 56.0 | 2.04 | Comparative Example |
| No. 3 | 0.2 | 93.2 | 96.5 | 55.0 | 2.04 | Example |
| No. 4 | 0.3 | 95.9 | 96.5 | 54.5 | 2.04 | Example |

TABLE 3-continued

| Trans-former | Compression Force (MPa) | Average Stacking factor (%) A | B | Sound Pressure (dB) | Iron Loss (W) | Example/Comparative Example |
|---|---|---|---|---|---|---|
| No. 5 | 0.4 | 96.4 | 96.5 | 53.0 | 2.04 | Example |
| No. 6 | 0.5 | 96.5 | 96.5 | 53.0 | 2.03 | Example |
| No. 7 | 0.6 | 96.8 | 96.5 | 52.0 | 2.03 | Example |
| No. 8 | 1.0 | 96.8 | 96.5 | 52.0 | 2.02 | Example |
| No. 9 | 2.0 | 96.9 | 96.5 | 51.0 | 2.01 | Example |
| No. 10 | 4.0 | 96.9 | 96.5 | 51.0 | 2.00 | Example |

As illustrated in Table 3, making the average stacking factor of the electrical steel sheets at the four bent portions, i.e. the average stacking factor A, so as to be (B−4.0)% or greater results in a smaller sound pressure and reduced iron loss. Moreover, as illustrated in FIG. 6, the sound pressure was made even smaller in cases in which the average stacking factor A was 96.0% or greater.

Thus the present disclosure enables provision of a wound core having reduced iron loss and suppressed noise.

Detailed explanation has been given regarding preferable exemplary embodiments and examples of the present disclosure, with reference to the appended drawings, however the present disclosure is not limited to these examples. Various modifications and improvements within a range of technological principles recited in the scope of the claims will be apparent to a person of ordinary skill in the field of technology of the present disclosure, and obviously these modifications and improvements should also be understood to belong to the technical range of the present disclosure.

Further disclosure is made of the following supplements in relation to the above exemplary embodiments.

Supplement 1

A wound core equipped with a laminated body including plural electrical steel sheets stacked in a ring shape in side view, wherein:

the laminated body includes plural bent portions, and plural block-shaped portions at positions between adjacent bent portions; and at least one bent portion among the plural bent portions is a high stacking factor bent portion, wherein a stacking factor of the electrical steel sheets at the high stacking bent portion is higher than an average stacking factor of the electrical steel sheets at the plural block-shaped portions.

Supplement 2

The wound core of supplement 1, wherein an average stacking factor A of the electrical steel sheets at the plural bent portions is (B−4.0) % or greater, wherein B is an average stacking factor (%) of the electrical steel sheets at the plural block-shaped portions.

Supplement 3

The wound core of supplement 1 or supplement 2, further including a compression means configured to compress the plural electrical steel sheets at the high stacking factor bent portion in a stacking direction of the electrical steel sheets.

Supplement 4

The wound core of supplement 3, wherein the compression means includes:

a first fixture disposed at an outer peripheral side of the high stacking factor bent portion and configured to abut the high stacking factor bent portion;

a second fixture disposed at an inner peripheral side of the high stacking factor bent portion and configured to abut the high stacking factor bent portion; and a coupling part configured to couple the first fixture and the second fixture together, wherein the first fixture and the second fixture receive constraining force from the coupling part and the plural electrical steel sheets at the high stacking factor bent portion are compressed in the electrical steel sheet stacking direction.

Supplement 5

The wound core of supplement 4, wherein the first fixture and the second fixture are formed by a non-magnetic material, or the coupling part is formed by a non-magnetic material.

Supplement 6

The wound core of supplement 3, wherein:

the wound core includes a pair of facing bent portions that face each other across a center of the laminated body in side view;

the facing bent portions are each high stacking factor bent portions; and the compression means includes a compression member configured to compress the facing bent portions across the center of the laminated body in side view.

Supplement 7

The wound core of supplement 6, wherein the compression member is a rod-shaped beam capable of extension-contraction adjustment that is disposed at an inner side the laminated body and on a straight line connecting internal corner portions of the respective high stacking factor bent portions facing each other in side view, and in an extended state the compression member compresses the plural electrical steel sheets at the facing high stacking factor bent portions in the electrical steel sheet stacking direction.

Supplement 8

The wound core of supplement 6 or supplement 7, wherein the compression member is formed by a non-magnetic material.

Supplement 9

The wound core of any one of supplement 1 to supplement 8, wherein the high stacking factor bent portion is compressed at a pressure of from 0.2 MPa to 4.0 MPa.

Supplement 10

The wound core of any one of supplement 1 to supplement 9, wherein a stacking factor C of the electrical steel sheets at the high stacking factor bent portion is from B % to (B+1)%, wherein B is an average stacking factor (%) of the electrical steel sheets at the plural block-shaped portions.

Supplement 11

The wound core of any one of supplement 1 to supplement 10, wherein all of the bent portions are high stacking factor bent portions.

Supplement 12

The wound core of any one of supplement 1 to supplement 11, wherein a shape of the laminated body when viewed from a side face is an octagonal shape including four of the block-shaped portions and four of the bent portions.

Supplement 13

A wound core equipped with a laminated body including plural electrical steel sheets stacked in a ring shape in side view, plural bent portions, and plural block-shaped portions at positions between adjacent bent portions, wherein at least one bent portion among the plural bent portions is a high stacking factor bent portion with a stacking factor of the electrical steel sheets at the bent portion that is an average stacking factor of the electrical steel sheets at the plural block-shaped portions or greater.

Supplement 14

The wound core of supplement 13, wherein an average stacking factor A of the electrical steel sheets at the plural bent portions is (B−4.0) % or greater, wherein B is an average stacking factor (%) of the electrical steel sheets at the plural block-shaped portions.

Supplement 15

The wound core of supplement 13 or supplement 14, wherein the high stacking factor bent portion is equipped with a compression means configured to compress the high stacking factor bent portion in a stacking direction of the electrical steel sheets.

Supplement 16

The wound core of supplement 15, wherein the compression means includes:

fixtures disposed at an outer peripheral side and an inner peripheral side of the high stacking factor bent portion and configured to abut the high stacking factor bent portion; and a coupling part configured to couple the fixture disposed at the outer peripheral side to the fixture disposed at the inner peripheral side such that the fixtures receive biasing force from the coupling part and compress the bent portion in the electrical steel sheet stacking direction.

Supplement 17

The wound core of supplement 16, wherein the fixtures or the coupling part include a non-magnetic member.

Supplement 18

The wound core of supplement 15, wherein the compression means includes a compression member configured to compress the facing bent portions across a center of the laminated body in side view.

Supplement 19

The wound core of supplement 18, wherein the compression member is a non-magnetic material.

Supplement 20

The wound core of any one of supplement 13 to supplement 19, wherein the high stacking factor bent portion is compressed at a pressure of from 0.2 MPa to 4.0 MPa.

Supplement 21

The wound core of any one of supplement 13 to supplement 20, wherein a stacking factor C of the electrical steel sheets at the high stacking factor bent portion is from B % to (B+1)%, wherein B is an average stacking factor (%) of the electrical steel sheets at the plural block-shaped portions.

Supplement 22

The wound core of any one of supplement 13 to supplement 21, wherein a shape of the laminated body when viewed from a side face is an octagonal shape.

Note that the entire content of the disclosure of Japanese Patent Application No. 2019-16446 filed on Sep. 10, 2019 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A wound core comprising:

a laminated body including a plurality of electrical steel sheets stacked in a ring shape in side view, wherein:

the laminated body includes a plurality of bent portions, and a plurality of block-shaped portions at positions between adjacent bent portions; and at least one bent portion among the plurality of bent portions is a high stacking factor bent portion, wherein a stacking factor of the electrical steel sheets at the high stacking bent portion is higher than an average stacking factor of the electrical steel sheets at the plurality of block-shaped portions, wherein an average stacking factor A of the electrical steel sheets at the plurality of bent portions is (B−4.0) % or greater, wherein B is an average stacking factor (%) of the electrical steel sheets at the plurality of block-shaped portions.

2. The wound core of claim 1, further comprising a compression means configured to compress the plurality of electrical steel sheets at the high stacking factor bent portion in a stacking direction of the electrical steel sheets.

3. The wound core of claim 2, wherein the compression means includes:

a first fixture disposed at an outer peripheral side of the high stacking factor bent portion and configured to abut the high stacking factor bent portion;

a second fixture disposed at an inner peripheral side of the high stacking factor bent portion and configured to abut the high stacking factor bent portion; and a coupling part configured to couple the first fixture and the second fixture together, wherein the first fixture and the second fixture receive constraining force from the coupling part, and the plurality of electrical steel sheets at the high stacking factor bent portion are compressed in the electrical steel sheet stacking direction.

4. The wound core of claim 3, wherein the first fixture and the second fixture are formed by a non-magnetic material, or the coupling part is formed by a non-magnetic material.

5. The wound core of claim 2, wherein:

the wound core includes a pair of facing bent portions that face each other across a center of the laminated body, in side view;

the facing bent portions are each high stacking factor bent portions; and the compression means includes a compression member configured to compress the facing bent portions across the center of the laminated body in side view.

6. A wound core comprising:

a laminated body including a plurality of electrical steel sheets stacked in a ring shape in side view; and a compression means, wherein:

the laminated body includes a plurality of bent portions, and a plurality of block-shaped portions at positions between adjacent bent portions, at least one bent portion among the plurality of bent portions is a high stacking factor bent portion, a stacking factor of the electrical steel sheets at the high stacking bent portion being higher than an average stacking factor of the electrical steel sheets at the plurality of block-shaped portions, the compression means is configured to compress the plurality of electrical steel sheets at the high stacking factor bent portion in a stacking direction of the electrical steel sheets, the wound core includes a pair of facing bent portions that face each other across a center of the laminated body, in side view, the facing bent portions are each high stacking factor bent portions, the compression means includes a compression member configured to compress the facing bent portions across the center of the laminated body in side view, and the compression member is a rod-shaped beam capable of extension-contraction adjustment that is disposed at an inner side of the laminated body and on a straight line connecting internal corner portions of the respective high stacking factor bent portions facing each other in side view, and, in an extended state, the compression member compresses the plurality of electrical steel sheets at the facing high stacking factor bent portions in the electrical steel sheet stacking direction.

7. The wound core of claim 5, wherein the compression member is formed by a non-magnetic material.

8. The wound core of claim 1, wherein the high stacking factor bent portion is compressed at a pressure of from 0.2 MPa to 4.0 MPa.

9. A wound core comprising:

a laminated body including a plurality of electrical steel sheets stacked in a ring shape in side view, wherein:

the laminated body includes a plurality of bent portions, and a plurality of block-shaped portions at positions between adjacent bent portions, at least one bent portion among the plurality of bent portions is a high stacking factor bent portion, a stacking factor of the electrical steel sheets at the high stacking bent portion being higher than an average stacking factor of the electrical steel sheets at the plurality of block-shaped portions, and a stacking factor C of the electrical steel sheets at the high stacking factor bent portion is from B % to (B+1) %, wherein B is an average stacking factor (%) of the electrical steel sheets at the plurality of block-shaped portions.

10. The wound core of claim 1, wherein all of the bent portions are high stacking factor bent portions.

11. The wound core of claim 1, wherein a shape of the laminated body when viewed from a side face is an octagonal including four of the block-shaped portions and four of the bent portions.

12. A wound core comprising:

a laminated body including a plurality of electrical steel sheets stacked in a ring shape in side view; and a compression means, wherein:

the laminated body includes a plurality of bent portions, and a plurality of block-shaped portions at positions between adjacent bent portions, at least one bent portion among the plurality of bent portions is a high stacking factor bent portion, a stacking factor of the electrical steel sheets at the high stacking bent portion being higher than an average stacking factor of the electrical steel sheets at the plurality of block-shaped portions, the compression means is configured to compress the plurality of electrical steel sheets at the high stacking factor bent portion in a stacking direction of the electrical steel sheets, the compression means includes:

a first fixture disposed at an outer peripheral side of the high stacking factor bent portion and configured to abut the high stacking factor bent portion;

a second fixture disposed at an inner peripheral side of the high stacking factor bent portion and configured to abut the high stacking factor bent portion; and a coupling part configured to couple the first fixture and the second fixture together, the first fixture and the second fixture receive constraining force from the coupling part, and the plurality of electrical steel sheets at the high stacking factor bent portion are compressed in the electrical steel sheet stacking direction, the first fixture is an outer sheet, the second fixture is an inner sheet, the coupling part consists of bolts and nuts, and the outer sheet and the inner sheet are long in the width direction of the electrical steel sheet, and both ends in their respective long directions protrude from the side surfaces of the high stacking factor bent portion and are coupled by bolts and nuts.

* * * * *